United States Patent
Gremmert et al.

(10) Patent No.: US 9,934,621 B2
(45) Date of Patent: *Apr. 3, 2018

(54) AUTOMATED TRANSMISSION OF VEHICLE ANOMALOUS INCIDENT DATA VIA PREFERRED TRANSMISSION MODES

(71) Applicant: Honeywell International Inc., Morris Plains, NJ (US)

(72) Inventors: Scott R. Gremmert, Redmond, WA (US); Stephen Wilmot, Monroe, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,231

(22) Filed: Jan. 17, 2017

(65) Prior Publication Data

US 2017/0323492 A1 Nov. 9, 2017

Related U.S. Application Data

(63) Continuation of application No. 14/675,317, filed on Mar. 31, 2015, now Pat. No. 9,607,447.

(51) Int. Cl.
*G07C 5/00* (2006.01)
*G08G 5/00* (2006.01)
(Continued)

(52) U.S. Cl.
CPC ............ *G07C 5/008* (2013.01); *G01S 13/953* (2013.01); *G01S 17/933* (2013.01); *G08G 5/0013* (2013.01); *G08G 5/0021* (2013.01)

(58) Field of Classification Search
CPC combination set(s) only.
See application file for complete search history.

(56) References Cited

U.S. PATENT DOCUMENTS 4,438,475 A * 3/1984 Haley ................... H02H 7/265
                                                            324/522
5,459,469 A * 10/1995 Schuchman .......... G01S 13/765
                                                             342/32

(Continued)

FOREIGN PATENT DOCUMENTS

EP       2166678 A2    3/2010
EP       2860601 A1    4/2015

OTHER PUBLICATIONS

"Digital Flight Data Acquisition Unit," FDAMS DFDAU, Product Description, Honeywell, May 2, 2004, 14 pp.

(Continued)

*Primary Examiner* — Jonathan L Sample
(74) *Attorney, Agent, or Firm* — Fogg & Powers LLC

(57) ABSTRACT

This disclosure is directed to techniques for automated transmission of surveillance incident data or other anomalous incident data from an aircraft via a preferred transmission mode. An example method includes detecting, by a processing device onboard an aircraft, an anomalous incident involving the aircraft that qualifies for reporting relative to a set of anomalous incident reporting criteria. The method further includes identifying, by the processing device, data onboard the aircraft relevant to the anomalous incident. The method further includes detecting that the aircraft is in a status that makes available a selected data transmission mode for transmitting the data relevant to the anomalous incident. The method further includes communicating the data relevant to the anomalous incident to a transmission system for transmission from the aircraft via the selected data transmission mode in response to detecting that the aircraft is in the status that makes available the selected data transmission mode.

20 Claims, 5 Drawing Sheets

(51) Int. Cl.
*G01S 17/93* (2006.01)
*G01S 13/95* (2006.01)

(56) References Cited

U.S. PATENT DOCUMENTS

| | | | | |
|---|---|---|---|---|
| 5,933,098 | A * | 8/1999 | Haxton | B60R 25/1012 340/430 |
| 5,974,349 | A * | 10/1999 | Levine | B64F 5/00 340/945 |
| 6,148,179 | A * | 11/2000 | Wright | G08G 5/0013 340/531 |
| 6,167,238 | A * | 12/2000 | Wright | H04W 52/282 340/3.3 |
| 6,173,159 | B1 | 1/2001 | Wright et al. | |
| 6,181,990 | B1 * | 1/2001 | Grabowsky | B64D 47/00 342/33 |
| 6,353,779 | B1 * | 3/2002 | Simon | H04B 7/18506 244/1 R |
| 6,721,640 | B2 | 4/2004 | Glenn et al. | |
| 6,898,492 | B2 | 5/2005 | de Leon et al. | |
| 6,915,189 | B2 | 7/2005 | Igloi et al. | |
| 7,006,032 | B2 * | 2/2006 | King | G01S 3/023 342/29 |
| 7,061,401 | B2 * | 6/2006 | Voos | G08G 5/0013 340/961 |
| 7,489,992 | B2 * | 2/2009 | Valette | G07C 5/008 340/945 |
| 7,698,025 | B1 * | 4/2010 | Cornell | G01C 23/00 244/75.1 |
| 7,908,042 | B2 * | 3/2011 | Brinkley | H04B 7/18506 342/29 |
| 8,131,407 | B1 * | 3/2012 | Robinson | G01C 23/00 340/945 |
| 8,190,727 | B2 * | 5/2012 | Henkel | H04L 67/12 709/208 |
| 8,437,904 | B2 | 5/2013 | Mansouri et al. | |
| 8,477,061 | B1 * | 7/2013 | Pedersen | G01S 13/9303 342/42 |
| 8,629,788 | B1 * | 1/2014 | Greenleaf | G08G 5/0091 244/116 |
| 8,730,064 | B2 | 5/2014 | Harrison et al. | |
| 9,047,762 | B1 * | 6/2015 | Neuville | G08G 5/0021 |
| 2005/0156777 | A1 * | 7/2005 | King | G01S 3/023 342/29 |
| 2009/0027232 | A1 * | 1/2009 | Lavielle | H04B 7/18506 340/971 |
| 2010/0057899 | A1 * | 3/2010 | Henkel | H04L 67/12 709/223 |
| 2010/0095084 | A1 * | 4/2010 | Manning | G06F 12/0246 711/206 |
| 2011/0276217 | A1 | 11/2011 | Sim et al. | |
| 2011/0298618 | A1 * | 12/2011 | Stahl | H04M 1/72519 340/573.1 |
| 2012/0177198 | A1 * | 7/2012 | Cabos | H04L 9/0825 380/270 |
| 2012/0191273 | A1 * | 7/2012 | Jacobs | H04B 7/18508 701/3 |
| 2013/0083960 | A1 | 4/2013 | Kostrzewski et al. | |
| 2013/0197721 | A1 * | 8/2013 | Gu | G06Q 10/00 701/3 |
| 2013/0242864 | A1 * | 9/2013 | Vermande | H04W 40/20 370/328 |
| 2014/0197980 | A1 * | 7/2014 | Schulte | G01S 13/91 342/37 |
| 2014/0210648 | A1 * | 7/2014 | Samuthirapandian | G08G 5/0008 340/961 |
| 2014/0249693 | A1 * | 9/2014 | Stark | B64C 39/024 701/2 |
| 2014/0343761 | A1 | 11/2014 | Pastor | |
| 2015/0296500 | A1 * | 10/2015 | Kanovsky | H04W 72/048 455/512 |
| 2015/0344149 | A1 * | 12/2015 | Mumaw | G05B 23/0251 701/33.4 |

OTHER PUBLICATIONS

"FLYHTStream," FLYHT Aerospace Solutions Ltd., retrieved from http://flyht.com/solutions/flyhtstream/ on Dec. 7, 2014, 2 pp.
"Wireless GroundLink® Quick Access Recorder FAQs," Teledyne Technologies Incorporated, retrieved from http://www.teledyne-controls.com/productsolution/wirelessgroundlink/groundlink_FAQ.asp on Feb. 27, 2014, 5 pp.
Maggiore et al., "Monitoring Real-Time Environmental Performance," AERO QTR_03.09, Boeing, retrieved from http://www.boeing.com/commercial/aeromagazine/articles/qtr_03_09/article_07_1.html on Feb. 27, 2015, 4 pp.
Uijt de Haag, M., "EE6900 Flight Management Systems, Aircraft Communications and Reporting System," Ohio University, retrieved from http://www.ohio.edu/people/uijtdeha/ee6900_fms_08_acars.pdf on Feb. 11, 2015, 20 pp.
Partial European Search Report from counterpart European Application No. 16162506.6, dated Sep. 19, 2016, 6 pp.
Extended European Search Report from counterpart European Application No. 16162506.6, dated Dec. 12, 2016, 11 pp.
Prosecution History from U.S. Appl. No. 14/675,317, dated from Apr. 29, 2016 through Dec. 21, 2016, 41 pp.

* cited by examiner

, a Very High Frequency (VHF) transceiver, a High-Frequency (HF) transceiver, or a transceiver for communicating with ground-based broadband or cellular, potentially under control of a communications management unit (CMU) or an Aircraft Communications Addressing and Reporting System (ACARS), in response to detecting when the aircraft is in range or otherwise in available status for the selected transmission mode. A system of this disclosure may also select other forms of communication, such as SatCom, VHF or HF radio data link, in some cases, such as where lower-cost data transmission modes (e.g., Gatelink) have been unavailable for more than a selected length of time depending on the severity or priority level of the data. A system of this disclosure may thus enable automated, efficient, and economical transmission of anomalous incident data from the applicable aircraft onboard systems to the airline or other aircraft operator.

AUTOMATED TRANSMISSION OF VEHICLE ANOMALOUS INCIDENT DATA VIA PREFERRED TRANSMISSION MODES

This application is a Continuation of application Ser. No. 14/675,317, filed Mar. 31, 2015, the entire content of which is hereby incorporated by reference.

TECHNICAL FIELD

This disclosure relates to aviation systems.

BACKGROUND

In certain circumstances, it may be legally required and/or of commercial interest for an airline or other aircraft operator to download certain surveillance incident-related data from avionic systems of an aircraft, from data that typically only remains stored temporarily on the applicable avionic system on the aircraft. Such surveillance data may include Traffic Collision Avoidance System (TCAS) data, in situations in which an aircraft experiences an incident such as flying too close to another aircraft, for example. Such surveillance data may be useful or important for a relevant authority and/or an airline or other aircraft operator to analyze and to study how to prevent such surveillance incidents in the future. In such cases, to download the surveillance data, airline personnel may typically schedule a time when they can visit the aircraft to connect a computer to the onboard TCAS system or other appropriate aircraft avionic system to perform the download.

SUMMARY

This disclosure is directed to methods, systems, and computer program products for automatically delivering relevant surveillance incident data or other anomalous incident data from aircraft systems to an off-aircraft data store in ways that may meet requirements for data completeness, data integrity, data security, and operating cost. Traditional procedures for scheduling an airline personnel to visit an aircraft to physically connect a computer to applicable aircraft systems to download surveillance incident data are associated with expense, delay, and the possibility of inadvertently introducing malware from the personnel computer to the aircraft systems. A system of this disclosure may instead enable automated and efficient wireless download of surveillance incident data or other anomalous incident data from an applicable aircraft system, such as a TCAS system, a ground proximity warning system (GPWS), or a weather radar (WXR) system, for example, to an external system such as an airline operations center network.

It may be expensive and difficult or impossible, as well as unnecessary, to transmit all relevant surveillance incident data or other anomalous incident data (collectively, "anomalous incident data") from the aircraft to a ground-based system while the aircraft is still in flight. A system of this disclosure may instead detect relevant anomalous incident data for an incident; determine when the aircraft is in range or otherwise in a status that makes available a selected data transmission mode for the anomalous incident data, which may be an efficient and economical data transmission mode such as Gatelink, Wi-Fi, ground-based mobile broadband (e.g., 4G/LTE), broadband satellite communication (SatCom), or ground-based cellular datalink (e.g., 2G or 3G); and communicate the anomalous incident data to the applicable data routing or transmission system, such as a Gatelink transceiver, a Very High Frequency (VHF) transceiver, a High-Frequency (HF) transceiver, or a transceiver for communicating with ground-based broadband or cellular, potentially under control of a communications management unit (CMU) or an Aircraft Communications Addressing and Reporting System (ACARS), in response to detecting when the aircraft is in range or otherwise in available status for the selected transmission mode. A system of this disclosure may also select other forms of communication, such as SatCom, VHF or HF radio data link, in some cases, such as where lower-cost data transmission modes (e.g., Gatelink) have been unavailable for more than a selected length of time depending on the severity or priority level of the data. A system of this disclosure may thus enable automated, efficient, and economical transmission of anomalous incident data from the applicable aircraft onboard systems to the airline or other aircraft operator.

In one example, a method includes detecting, by a processing device onboard an aircraft, an anomalous incident involving the aircraft that qualifies for reporting relative to a set of anomalous incident reporting criteria. The method further includes identifying, by the processing device, data onboard the aircraft relevant to the anomalous incident. The method further includes detecting, by the processing device, that the aircraft is in a status that makes available a selected data transmission mode for transmitting the data relevant to the anomalous incident. The method further includes communicating, by the processing device, the data relevant to the anomalous incident to a transmission system for transmission from the aircraft via the selected data transmission mode in response to detecting that the aircraft is in the status that makes available the selected data transmission mode.

In another example, a system onboard an aircraft includes one or more processing devices. The one or more processing devices are configured to detect an anomalous incident involving an aircraft that qualifies for reporting relative to a set of anomalous incident reporting criteria. The one or more processing devices are further configured to identify data onboard the aircraft relevant to the anomalous incident. The one or more processing devices are further configured to detect that the aircraft is in a status that makes available a selected data transmission mode for transmitting the data relevant to the anomalous incident. The one or more processing devices are further configured to communicate the data relevant to the anomalous incident to a transmission system for transmission from the aircraft via the selected data transmission mode in response to detecting that the aircraft is in the status that makes available the selected data transmission mode.

In another example, a computer program product is configured to cause a computing device to detect an anomalous incident involving an aircraft that qualifies for reporting relative to a set of anomalous incident reporting criteria. The computer program product is further configured to identify data onboard the aircraft relevant to the anomalous incident. The computer program product is further configured to cause the computing device to detect that the aircraft is in range for a selected data transmission mode for transmitting the data relevant to the anomalous incident. The computer program product is further configured to cause the computing device to communicate the data relevant to the anomalous incident to a transmission system for transmission from the aircraft via the selected data transmission mode in response to detecting that the aircraft is in the status that makes available the selected data transmission mode.

The disclosure is also directed to an article of manufacture comprising a computer-readable storage medium. The computer-readable storage medium comprises computer-readable instructions that are executable by one or more processors. The instructions cause the one or more processors to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause one or more processors to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Various examples are described below directed to techniques, methods, systems, and computer program products for automatically transmitting relevant anomalous incident data from aircraft systems to an off-aircraft system. In particular, an automated anomalous incident reporting system onboard an aircraft may identify data onboard the aircraft relevant to an anomalous incident involving the aircraft, detect that the aircraft is in a status that makes available a selected data transmission mode, and communicate the data relevant to the anomalous incident to the transmission system for transmission from the aircraft via the selected data transmission mode in response to detecting that the aircraft is in the status that makes available the selected data transmission mode.

Figure 1:
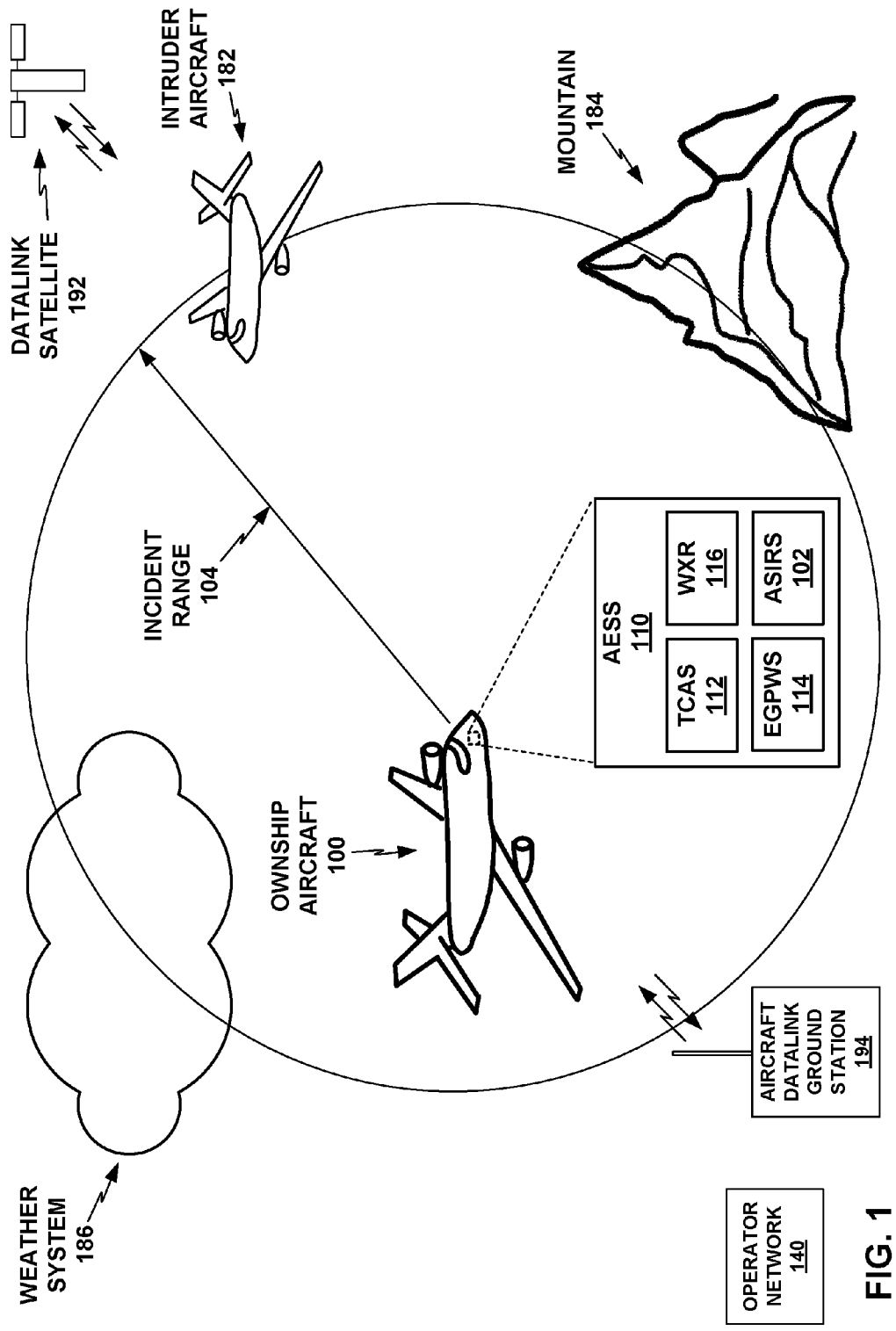
FIG. 1 is a conceptual diagram depicting an ownship aircraft equipped with an automated surveillance incident reporting system, and in flight among various potential hazards, including an intruder aircraft, a mountain, and a weather system, in an illustrative implementation.

FIG. 1 is a conceptual diagram depicting an ownship aircraft 100 ("ownship 100") equipped with an automated surveillance incident reporting system (ASIRS) 102 (as one example implementation of an automated anomalous incident reporting system (AAIRS)), and in flight among various potential hazards, including an intruder aircraft 182, a mountain 184, and a weather system 186, in an illustrative implementation. Ownship 100 may include aircraft systems that generate advisories or alerts regarding anomalous surveillance incidents involving aircraft 100 (e.g., related to potential hazards). Examples of such aircraft systems include a TCAS system 112, an enhanced ground proximity warning system (EGPWS) 114, and a weather radar (WXR) system 116. These and other aircraft systems that surveil the aircraft's surroundings and provide or perform an advisory or alerting function may collectively be referred to as aircraft surveillance systems. ASIRS 102 may identify surveillance data gathered, detected, or generated by TCAS system 112, EGPWS 114, WXR system 116, or other aircraft surveillance system. Other examples may be implemented with a more generalized automated anomalous incident reporting system (AAIRS) that may receive additional types of anomalous incident data besides surveillance incident data, from other types of anomaly alerting systems, as described further below. In some examples, ownship 100 may include an Aircraft Environment Surveillance System (AESS) 110 (or more generally, an integrated surveillance system (ISS) that may comply with Aeronautical Radio, Inc. (ARINC) Standard 768) that includes TCAS system 112, EGPWS 114, WXR system 116, and ASIRS 102 in an integrated system.

TCAS system 112 may detect the distance between ownship 100 and intruder aircraft 182 (or other proximate aircraft), and generate a Traffic Advisory (TA) if the separation between ownship 100 and intruder aircraft 182 drops below a TA separation threshold. TCAS system 112 may also generate a Resolution Advisory (RA) if the separation between ownship 100 and intruder aircraft 182 drops below an RA separation threshold, which is of less distance than the TA separation threshold. In many jurisdictions generally, TCAS alerts in commercial or general aviation may be defined by federal law, international agreements, and standards set by standards bodies such as the RTCA (e.g., RTCA DO-185). In illustrative examples, the TA and RA separation thresholds may be dependent on the speed, heading, altitude, or a combination thereof of ownship 100. For example, when ownship 100 is between 5,000 and 10,000 feet altitude, TCAS system 112 may define the TA separation threshold at 40 seconds of travel time of ownship 100, and the RA separation threshold at 25 seconds. The specific definitions for the TA and RA separation thresholds, or for other separation thresholds evaluated or defined by ASIRS 102, may vary in different implementations. Various implementations may also employ a TCAS system 112 that complies with any of different types and versions of TCAS, such as TCAS II version 7.0, 7.1, or any other applicable current or future TCAS version. Some implementations may also use other types of collision avoidance systems such as an Aircraft Collision Avoidance System (ACAS). The TCAS data collected and/or indicated by TCAS system 112 related to an RA, and potentially also to a TA, may be an example of surveillance data that ASIRS 102 identifies as relevant to a surveillance incident. In some other jurisdictions or in aircraft with new and/or experimental TCAS implementations, or other examples, a TCAS or other collision avoidance system may apply other criteria or algorithms for when to issue an alert. Any type of alerting criteria or algorithms may be applicable in different implementations of a system of this disclosure.

EGPWS 114 may detect the distance between ownship 100 and mountain 184 (or other ground obstacle) and generate a ground proximity alert if the distance between ownship 100 and mountain 184 drops below a ground proximity distance threshold. EGPWS 114 may be implemented by using a radar altimeter or radar range detector that detects the distance between the aircraft and ground surfaces, for example. EGPWS 114 may use a number of inputs such as aircraft position, attitude, air speed, glideslope to compare with the positions of ground surfaces. EGPWS 114 may also incorporate a database of ground surface terrain and obstacles that it may compare with present aircraft position, and take certain actions if it detects any new discrepancy between the ground surface database and the incoming ground surface data, such as target the discrepant ground surface to gather additional data. ASIRS 102 may include any or all of this data related to a ground proximity alert as part of its surveillance data relevant to a surveillance incident. EGPWS 114 as described herein is one example of a ground proximity warning system (GPWS). Some implementations may use other types of GPWS. In some examples, a GPWS or EGPWS may issue alerts in accordance with the United States Federal Aviation Administration (FAA) TSO C92 standard. Some examples may include a terrain awareness and warning system (TAWS) configured to generate TAWS alerts in accordance with the U.S. FAA TSO C151 standard or other applicable TAWS alerting criteria. A TAWS may also be a type of GPWS. Still other examples may include a GCAS, a T2CAS, a T3CAS, all of which may also be types of GPWS, and some of which may also integrate other functions such as TCAS, TAWS, ADS-B, TIS-B, wind shear alerting, and traffic management functions. As indicated above with reference to TCAS, in some other jurisdictions or in aircraft with new and/or experimental EGPWS, TAWS, or other type of GPWS implementations, or other examples, a GPWS of any of various types may apply other criteria or algorithms for when to issue an alert, and any type of alerting criteria or algorithms may be applicable in different implementations of a system of this disclosure. Thus, various implementations of this disclosure may include any type of GPWS, including Enhanced GPWS (EGPWS), or other types of terrain awareness and warning system (TAWS), a GCAS, a T2CAS, a T3CAS, or any other analogously functioning system by any other name.

WXR system 116 may detect the distance between ownship 100 and weather system 186, as well as detect if weather system 186 includes certain severe weather conditions such as wind speed, wind shear, or turbulence above a selected severity threshold. WXR system 116 may generate a weather system alert if WXR system 116 determines the weather conditions of weather system 186 to exceed one or more selected thresholds of severity, and if WXR system 116 detects that the distance between ownship 100 and weather system 186 drops below a selected weather system distance threshold. The selected threshold of severity may be rainfall above a selected threshold (such as 11.5 mm/hour), a temperature difference across the surface of the weather front above a selected threshold (e.g., above 10 degrees Fahrenheit or 5 degrees Celsius difference across the surface of the weather front), or wind shear or weather front speed above a selected threshold (e.g., 30 knots) (other examples of values for any of these thresholds may be used in other implementations). WXR system 116 may also generate a weather system alert if WXR system 116 detects any indication of thunder or lightning in the weather front (e.g., the selected threshold of severity for the presence of thunder or lightning may be any more than zero thunder or lightning detected, which are also indicative of potentially hazardous wind shear). WXR system 116 may also generate a weather system alert based on a predictive wind shear alert, a reactive wind shear alert, or a turbulence alert, for example. The weather hazard data collected and/or indicated by WXR system 116 related to an encounter with a weather system may be yet another example of surveillance data that ASIRS 102 identifies as relevant to a surveillance incident. In some examples, a weather alert system may issue weather alerts, turbulence alerts, or predictive wind shear alerts in accordance with the U.S. FAA TSO C63 standard. As in the examples of TCAS and EGPWS/GPWS discussed above, any of a wide variety of other alerting criteria or algorithms may be applicable in different implementations of a system of this disclosure.

In various other examples, an additional alerting system may also issue other types of alerts, for some of which ASIRS 102 may be implemented as a more generalized AAIRS that may also receive non-surveillance anomaly alerts. These example additional alerting systems may include a flight dynamics alerting system configured to generate reactive wind shear alerts in accordance with the U.S. FAA TSO C117 standard or other applicable reactive wind shear alerting criteria and/or configured to generate stall warning alerts in accordance with the U.S. FAA TSO C54 standard or other applicable stall warning alert criteria; a lightning alert system configured to generate an alert when it detects lightning in the vicinity of the aircraft; a cabin pressure alerting system configured to generate cabin pressure or hypoxia warnings alerts based on criteria or algorithms applied to readings from a cabin pressure sensor; a pilot condition alerting system configured to detect potential indications of pilot fatigue, hypoxia, food poisoning, duress, or any other type of impairment, suboptimal performance, or health condition of the pilot; an internal status alerting system configured to detect anomalous conditions in the cockpit or cabin, such as anomalous cabin pressure, or failure to correct an anomalous cabin pressure after a selected interval of time, or anomalous cabin ambient noise level, or failure to correct an anomalous cabin ambient noise level after a selected interval of time; an external icing monitoring and alerting system that may detect hazardous icing conditions on the exterior of the aircraft; or any other type of surveillance systems or anomaly detecting, monitoring, or alerting systems configured to generate alerts based on criteria or algorithms applied to other inputs or conditions. A pilot may also manually enter an emergency transponder code (e.g., transponder code 7500, 7600, or 7700) which ASIRS 102 may be configured to receive and interpret as a triggering criterion for transmitting anomalous incident report data and/or an anomalous incident notification. As in the examples discussed above, any of a wide variety of other alerting criteria or algorithms may be applicable in different implementations of a system of this disclosure. In some examples, an alert being generated by any one or more or any combination of these alerting systems described above may be considered to satisfy reporting criteria for reporting as a surveillance incident, with one of a number of different potential priority levels or urgency levels.

In still another example, aircraft 100 may have an internal sensor system that detects anomalous activity or conditions in the cockpit and/or cabin of the aircraft, such as anomalous cabin pressure or anomalous cabin ambient noise decibel level, and records or communicates data related to such onboard anomalies, which may be received by a more generalized AAIRS implementation of ASIRS 102. In yet another example, ASIRS 102 may record a stall warning as a surveillance incident, and extract, store, or otherwise identify data relevant to the stall warning. In any of these examples, ASIRS 102 may also gather and store any other relevant aircraft data simultaneous with or potentially related to a surveillance incident as additional surveillance data, such as speed, heading, altitude, or other parameters of the aircraft's trajectory or condition.

FIG. 1 depicts an incident range 104 around ownship 100 that may define a distance from ownship 100 such that an onboard incident alerting system (e.g., TCAS system 112, EGPWS 114, WXR system 116) may generate an applicable advisory or alert if the applicable hazard is detected within incident range 104. Incident range 104 as shown in FIG. 1 may represent a variable distance in different directions, with a larger distance in the direction of the heading of ownship 100. Incident range 104 as shown in FIG. 1 may represent a different distance for different types of environment surveillance modes, e.g., variably representing an RA distance threshold of TCAS system 112, a ground proximity distance threshold of EGPWS 114, or a weather system distance threshold of WXR system 116.

In some examples, incident range 104 may define either a generally cylindrical or generally spherical volume around ownship 100. For example, TCAS system 112 may combine a selected generally radial incident range 104 within a selected height or altitude difference above and below ownship 100 to define a generally cylindrical protected space around ownship 100, and generate an RA if another aircraft (e.g., intruder aircraft 182) is detected within that cylindrical space around ownship 100. As other examples, EGPWS 114 may generate a ground proximity alert if it detects a ground obstacle (e.g., mountain 184) within incident range 104 in any direction from ownship 100, and WXR system 116 may generate a weather system alert if it detects a severe weather system (e.g., weather system 186) within incident range 104 along the current heading or otherwise along a predicted flight path of or intercept course with ownship 100. In other examples, TCAS system 112 or any other kind of alerting system may not apply an incident range or other distance criterion, and may apply criteria based on any one or more of distance, speed, heading, acceleration, engine thrust, angle of attack, or various other conditions or parameters.

If ownship 100 passes within any of the applicable threshold distances (as measured in either time or distance) of either another aircraft (e.g., intruder aircraft 182), a ground obstacle (e.g., mountain 184), or a severe weather system (e.g., weather system 186), this may be considered an incident involving ownship 100, for purposes of ASIRS 102. ASIRS 102 may detect when any of TCAS system 112, EGPWS 114, or WXR system 116 issues or generates an applicable advisory or alert indicating a surveillance incident involving ownship 100, and ASIRS 102 may identify surveillance data related to the surveillance incident. The surveillance data or other data related or relevant to the surveillance incident or other anomalous incident as identified by ASIRS 102 (or a more generalized AAIRS implementation that may include ASIRS 102) may include surveillance data gathered, stored, and/or generated (collectively, "handled") by any onboard anomalous incident alerting system (e.g., TCAS system 112, EGPWS 114, WXR system 116, or any of the other onboard anomalous incident alerting systems described herein) related to the anomalous incident. For example, ASIRS 102 may identify surveillance data gathered, stored, and/or generated by TCAS system 112 related to an RA issued by TCAS system; or surveillance data gathered, stored, and/or generated by EGPWS 114 related to a ground proximity alert generated by EGPWS 114; or surveillance data gathered, stored, and/or generated by WXR system 116 related to a weather system alert generated by WXR system 116.

ASIRS 102 identifying surveillance data involved in a surveillance incident may include ASIRS 102 indexing the surveillance data, storing its own copy of the data, and/or storing addresses or locations of the data in data storage of another aircraft system such as TCAS system 112, EGPWS 114, or WXR system 116, for example. ASIRS 102 identifying surveillance data may also include ASIRS 102 extracting, from TCAS system 112, EGPWS 114, WXR system 116, or other aircraft system, specific surveillance data relevant to a surveillance incident. In some examples implemented in an AESS 110, ASIRS 102 may identify surveillance data stored in data storage of AESS 110 by a surveillance component of AESS 110, which may be TCAS system 112, EGPWS 114, or WXR system 116. ASIRS 102 may also detect additional data related to the surveillance incident beyond the data gathered and/or stored by TCAS system 112, EGPWS 114, or WXR system 116. In some examples, other aircraft systems may also detect certain surveillance incident conditions and potentially generate advisories or alerts and surveillance data related to the surveillance incident, and ASIRS 102 may identify the surveillance data related to the surveillance incident for which those other aircraft systems detect the surveillance incident conditions.

While ownship 100 is in flight and far from the nearest airport, ownship 100 may have a datalink connection to an external network, e.g., a ground-based airline operations network ("operator network") 140 operated by a commercial airline or other aircraft operator that operates ownship 100. The datalink connection may be implemented through a satellite-based, ground-based, or airborne-based communications system, or a combination of the above (e.g., via datalink satellite 192 and/or aircraft VHF or HF or cellular datalink ground station 194), and may be operated by a third-party network service provider that contracts for services with the airline or other aircraft operator. The datalink connection may enable needed communications in-flight that may be provided at a given cost per amount of data or at a given fixed rate per period of time (e.g., per year). For certain purposes of analyzing surveillance incident data related to a surveillance incident an aircraft is involved with, such as a TCAS RA, a ground proximity alert, or a weather system alert, it may be more practical or economical not to transmit all surveillance data related to the incident to operator network 140 via a third-party datalink service provider while the aircraft is still in flight, depending on the priority level or urgency level ASIRS 102 determines for transmitting the incident data (as further described below).

Figure 2:
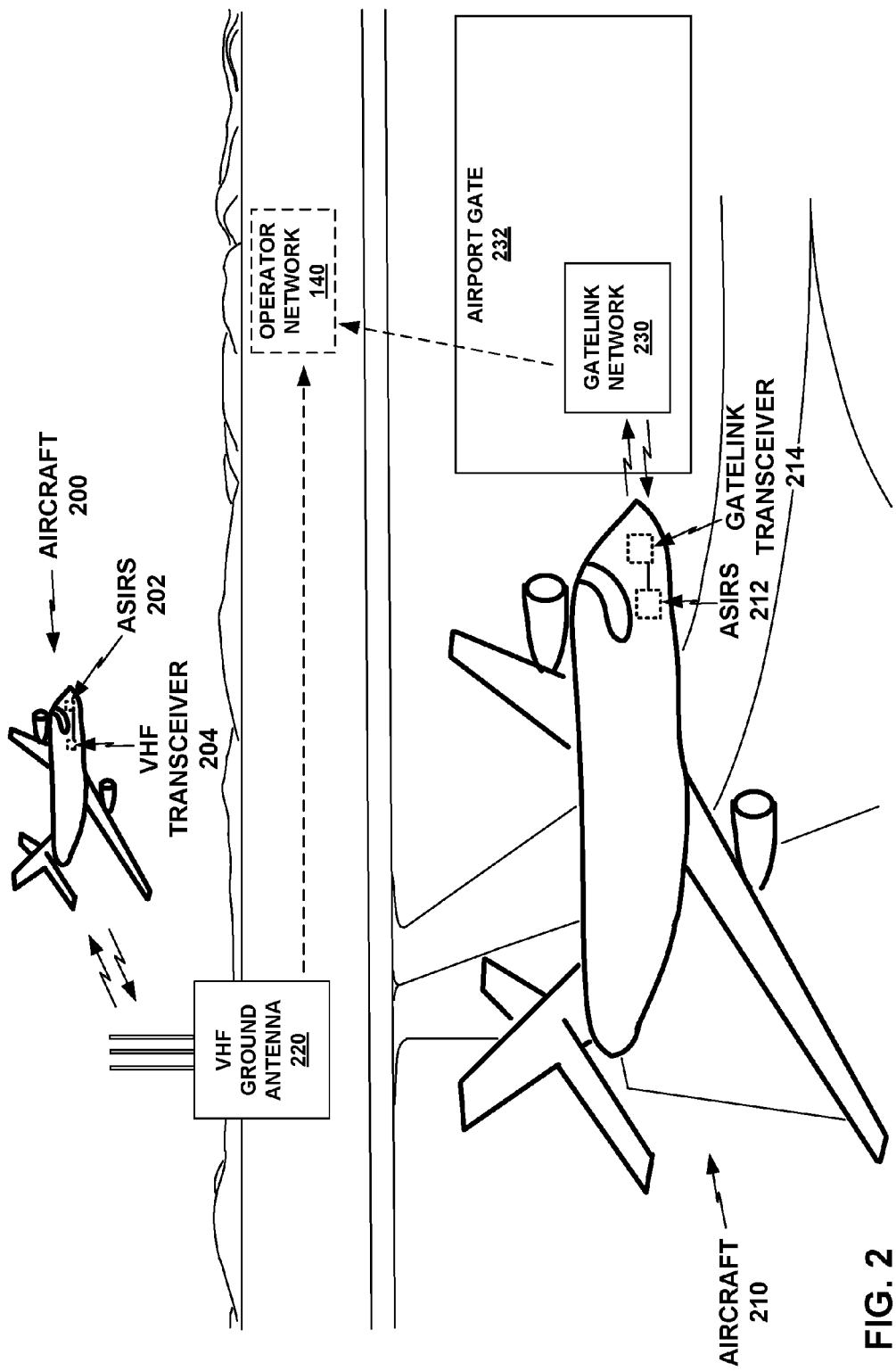
FIG. 2 is a conceptual diagram of two aircraft each equipped with an automated surveillance incident reporting system to detect that the respective aircraft is in range of a selected data transmission mode, in the form of an Very High Frequency (VHF) ground antenna and a Gatelink network at an airport gate, respectively, in an illustrative implementation.

ASIRS 102 may instead determine what data transmission modes are available to ownship 100 at different times, and detect when the aircraft is in a status that makes available a selected data transmission mode to transmit the surveillance data. In some examples, ASIRS 102 may determine what data transmission modes are available by requesting and/or receiving indications of available transmission modes from a CMU, while in some examples, ASIRS 102 may determine what data transmission modes are available by checking directly with the respective communication systems (e.g., the onboard SatCom, VHF, HF, Gatelink transceivers or systems). ASIRS 102 may detect that ownship 100 is in a status that makes available a selected data transmission mode when ownship 100 is in range for that transmission mode, such as within range of a VHF ground antenna or within range of a Gatelink network at an airport gate, for example. ASIRS 102 may detect that ownship 100 is in a status that makes available a selected data transmission mode by detecting that the applicable transmission system is functioning properly and is not currently occupied with other transmissions, for example. ASIRS 102 may store indications of one or more selected data transmission modes that are practical, economical, or otherwise favorable for transmitting surveillance incident data. Ownship 100 may be in a status that makes available a selected data transmission mode when ownship 100 is in range for the selected, favorable data transmission mode. For example, the selected data transmission mode may be Very High Frequency (VHF) radio in some examples, or Gatelink in some examples, or other datalink communication mode that ownship 100 is not in range for throughout a typical flight. Examples of an automated surveillance incident reporting system corresponding to ASIRS 102 detecting that its aircraft is in range of a selected data transmission mode such as VHF, HF, cellular, or Gatelink are shown in FIG. 2.

If ASIRS 102 determines that the incident data is of a sufficiently high priority level or urgency level, such as alert indications consistent with a possible imminent collision hazard, ASIRS 102 may designate whatever communication mode is available within a short time frame or is available immediately, regardless of cost, in some examples. Given a sufficiently high priority level or urgency level based on the ASIRS's own criteria applied to indications from the alerting system, ASIRS 102 may also override or otherwise bypass a CMU and send data and instructions directly to the applicable communications system to transmit the surveillance incident data off the aircraft as quickly as possible, such as by SatCom, in some examples. Overriding or bypassing a CMU or other intermediary system that typically connects to and controls or provides instructions to communication systems may generally be referred to as "bypassing the CMU" for purposes of this disclosure.

ASIRS 102 may determine a reporting priority level to be high, low, or an intermediate level. This may include a highest priority level, a lowest priority level, and potentially one or more intermediate levels, respectively. If ASIRS 102 determines the priority level to be high, ASIRS 102 may select any data transmission mode that is currently available to transmit the data off of the ownship aircraft 100 either within a short time or immediately (and without regard to relative expense among transmission modes), in some examples. Generally, if ASIRS 102 determines the priority level to be high, ASIRS 102 may select whichever transmission mode is currently available; and if more than one transmission modes are currently available, ASIRS 102 may select the transmission mode that enables transmission of the surveillance data within the shortest interval of time. In these examples, at some times only one transmission mode from among SatCom, HF, VHF, ground-based broadband, or ground-based cellular may be available at a given time; typically if only one transmission mode is available, it is SatCom. In these examples, if ASIRS 102 determines the reporting priority to be high and SatCom is the only transmission mode available, ASIRS 102 may communicate the surveillance data relevant to the surveillance incident to an onboard SatCom transceiver to transmit the surveillance data. This may include ASIRS 102 bypassing the CMU as described above, and/or impersonating a flight management computer (FMC) or other intermediary system, as described below, to reduce or eliminate any potential delay in transmission, if the priority level is at a highest level or otherwise sufficiently high, in some examples.

If ASIRS 102 determines the priority level to be at the lowest level or otherwise at a sufficiently low level, ASIRS 102 may simply wait to transmit the surveillance data via Gatelink once ownship aircraft 100 is at an airport, or may transmit a notification or other summary digest of the surveillance data and then transmit additional surveillance data (e.g., a main body of surveillance data) via Gatelink once ownship aircraft 100 only if a request for the additional surveillance data is received in response to the notification or other digest. If ASIRS 102 determines that the surveillance data is of an intermediate priority level (e.g., such that the data is not high priority enough that it necessarily should be transmitted immediately, but it should also not wait for ownship aircraft 102 to finish its flight), ASIRS may select an airborne transmission mode, e.g., from among SatCom, HF, and VHF, based on one or more criteria that may incorporate a combination of availability and cost. For example, the intermediate priority transmission mode selecting criteria may determine to use whatever is the least expensive currently available transmission mode, or whatever is the least expensive transmission mode that is anticipated to be available within a selected period of time (such as one hour or two hours, for example). In various examples, the least expensive airborne transmission mode may be SatCom, or HF, or VHF, or ground-based cellular aircraft service, or another transmission technology or service.

In some examples, ASIRS 102 may determine it has surveillance data with an intermediate reporting priority; ASIRS 102 may further determine that SatCom and HF are both currently available, and that SatCom would be less expensive than HF (or that HF would be less expensive than SatCom); and ASIRS 102 may communicate the surveillance data to an onboard SatCom transceiver (by way of a CMU in some examples) for transmission via the less expensive SatCom (or ASIRS 102 may communicate the surveillance data to an onboard HF transceiver (by way of a CMU in some examples) for transmission via the less expensive HF, respectively). ASIRS 102 may perform analogous determinations among SatCom and VHF, or SatCom, HF, and VHF, if all three are available, or among any other set of two or more potentially available transmission modes, in applicable scenarios with intermediate priority surveillance transmissions, and communicate the surveillance data via a selected transmission mode among SatCom, HF, VHF, or any others available based on whichever transmission mode anticipated to be available within a selected interval of time, a selected interval of distance traveled, or within an interval defined any other way that ASIRS 102 determines to be the least expensive, in various examples. In some examples, ASIRS 102 may also apply additional criteria, such as available bandwidth, in selecting from among two or more available transmission modes for intermediate priority surveillance data. For example, ASIRS 102 may determine that both SatCom and HF are available but that SatCom offers higher bandwidth, and ASIRS 102 may select SatCom because it has higher bandwidth, or ASIRS 102 may apply a combination of criteria that balance a difference in bandwidth and a difference in cost among each of multiple available transmission modes. The criteria applied by ASIRS 102 for intermediate priority transmissions for which examples are described herein may collectively be referred to as criteria of reduced expense of transmission mode and of transmission within a selected interval. Thus, if ASIRS 102 determines the priority level for transmitting the surveillance data to be intermediate priority, ASIRS 102 may select a transmission mode from among one or more of SatCom, High Frequency (HF), Very High Frequency (VHF), ground-based broadband, and ground-based cellular, based on criteria that include reduced expense of transmission mode and transmission within a selected interval.

FIG. 2 is a conceptual diagram of two aircraft 200, 210 each equipped with an automated surveillance incident reporting system (ASIRS) 202, 212, respectively, detecting that the respective aircraft is in a position within range of a selected data transmission mode, in the form of VHF ground antenna 220 and Gatelink network 230 at an airport gate 232, respectively, in an illustrative implementation. ASIRS 202 of aircraft 200 may detect that aircraft 200 is in range of VHF ground antenna 220, and communicate the surveillance incident data to VHF transceiver 204 of aircraft 200 (which may be configured to transmit ACARS data or other data) for transmission to VHF ground antenna 220. In other examples, ASIRS 202 may detect that an HF transceiver (not shown in FIG. 3) onboard aircraft 200 is able to connect (e.g., depending on charge of the ionosphere and transmission geometry) to an HF ground antenna (not shown in FIG. 3), and communicate the surveillance incident data to an HF transceiver of aircraft 200 for transmission over HF datalink to the HF ground antenna.

Some aircraft may be equipped with a VHF-only system with no ACARS present, while many more modern aircraft are equipped with an ACARS system or CMU capable of transmitting over either traditional VHF, HF, SatCom, or cellular datalink. Gatelink may have a maximum range dependent on how a particular Gatelink network is implemented, e.g., via Wi-Fi, mobile broadband, or cellular technology, for example. Gatelink range may require aircraft 200 to be at or proximate to Gatelink network 230 (e.g., to an interface to Gatelink network 230 such as a Gatelink Wi-Fi router) which may be at airport gate 232, though being proximate to Gatelink network 230 may extend a significant distance out on a taxiway from the airport gate 232, or throughout the airport, in some examples. Being proximate to Gatelink network 230 or otherwise being in Gatelink range may require aircraft 200 to be within Wi-Fi range of a Gatelink Wi-Fi router, which may be located anywhere in the airport, in some examples. VHF may have a maximum range of approximately 200 miles (~320 kilometers) from the nearest VHF ground antenna, in some examples, and may be more economical for data transmission than SatCom, which may provide coverage throughout the Earth's airspace, either except for or including the north and south polar regions, in different examples. In some examples, whether or not aircraft 200 is equipped with SatCom transmission capability, ASIRS 202 may have a designation of data transmissions over VHF as the preferred or selected data transmission mode for transmitting surveillance incident data, in which aircraft 200 may transmit data via VHF transceiver 204 to VHF ground antenna 220.

ASIRS 202 may detect when aircraft 200 is within range of a VHF antenna such as VHF ground antenna 220, in some examples. If ASIRS 202 has collected surveillance incident data and detected that the only currently available communication mode is SatCom, ASIRS 202 may wait until it detects that aircraft 200 is in range of a VHF antenna. Once ASIRS 202 detects that aircraft 200 is in range of VHF ground antenna 220, ASIRS 202 then, in response, communicates the surveillance incident data to VHF transceiver 204 onboard aircraft 200 for transmission to VHF ground antenna 220. ASIRS 202 may thus communicate the relevant surveillance incident data via VHF ground antenna 220 to operator network 140. If more than one VHF ground antenna is within range and aircraft 200 is preparing to land at an airport, such that one VHF ground antenna is proximate to the airport, a CMU or ACARS onboard aircraft 200 may opt to transmit ACARS data to the VHF ground antenna proximate to the airport.

In some other examples, ASIRS 202 may have a designation of the selected data transmission mode as VHF data transmissions separate from ACARS data. In these examples, ASIRS 202 may also detect when aircraft 200 is in range of a VHF ground antenna, and in response to detecting that aircraft 200 has come within range of a VHF ground antenna, ASIRS 202 may communicate the surveillance data relevant to the surveillance incident to VHF transceiver 204 (which may also be capable of non-ACARS VHF transmissions) for transmission from aircraft 200 to operator network 140 via the selected data transmission mode of VHF.

In the example of aircraft 210 in FIG. 2, aircraft 210 may be equipped with a Gatelink transceiver 214, and ASIRS 212 may have a designation of the selected data transmission mode as Gatelink. Gatelink may enable high data rates at short range when an aircraft is at an airport gate. In examples such as this, ASIRS 212 may detect when aircraft 210 is in range of a Gatelink network 230 at an airport gate 232, such as once aircraft 210 has landed and taxied to airport gate 232. ASIRS 212, in response to detecting that aircraft 210 has come within range of Gatelink network 230, may communicate the data relevant to the surveillance incident to the aircraft's Gatelink transceiver 214 for transmission from aircraft 210 to Gatelink network 230 and via Gatelink network 230 to operator network 140 via the selected data transmission mode of Gatelink.

Figure 3:
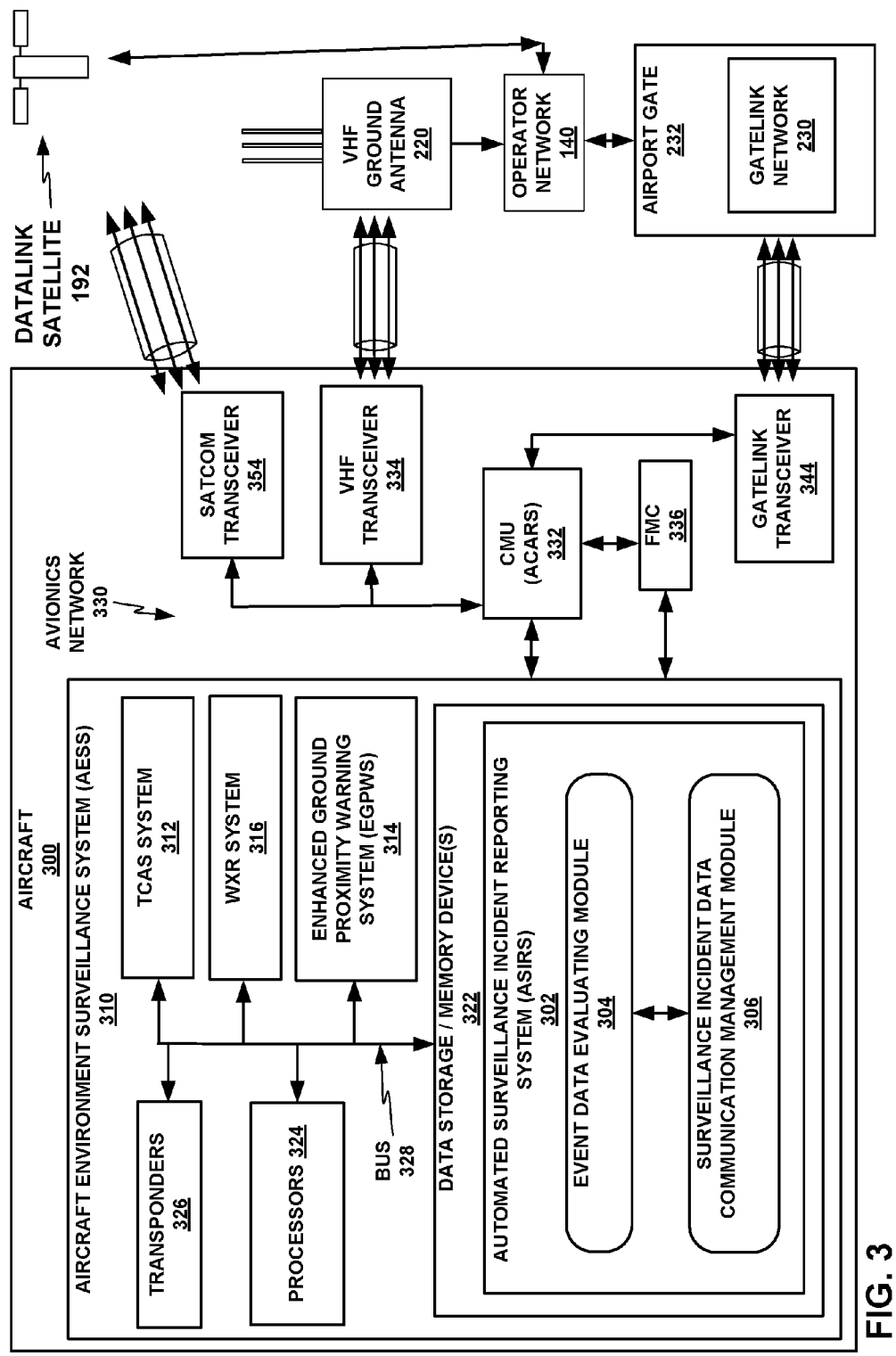
FIG. 3 shows another example of an aircraft that includes an Aircraft Environment Surveillance System (AESS) equipped with an automated surveillance incident reporting system and communicatively connected via an onboard avionics network to various data transmission systems, including a VHF transceiver, an HF transceiver, a Gatelink transceiver, and a SatCom transceiver, in an illustrative implementation.

FIG. 3 shows another example of an aircraft 300 that includes an Aircraft Environment Surveillance System (AESS) 310 equipped with an automated surveillance incident reporting system (ASIRS) 302 and communicatively connected via an onboard avionics network 330 to a communications management unit (CMU) (or ACARS) 332, and thereby to various data transmission systems, including a VHF transceiver 334, an HF transceiver (not shown in FIG. 3), Gatelink transceiver 344, and SatCom transceiver 354, in an illustrative implementation. VHF transceiver 334 may be configured to receive data via any of various types of CMU (or ACARS) 332, in different examples. AESS 310 is also communicatively connected via onboard avionics network 330 to a flight management computer (FMC) 336 that may provide relevant data to ASIRS 302. (In some examples, ASIRS 302 may communicate data to an ACARS 332 by impersonating either FMC 336, a Digital Flight Data Acquisition Unit (DFDAU), a Centralized Fault Display Interface Unit (CFDIU), or a cabin terminal.) AESS 310 also includes a TCAS system 312, an Enhanced Ground Proximity Warning System (EGPWS) 314, a WXR system 316, transponders 326, processors 324, and one or more data storage devices (e.g., nonvolatile Flash memory or hard disc drives) and/or memory (e.g., random access memory) devices 322, all communicatively interconnected by a bus 328.

ASIRS 302 may be implemented at least in part using various software modules stored and/or loaded on data storage/memory devices 322 in this example, which may be executed by one or more processors 324. In particular, ASIRS 302 may include an event data evaluating module 304 and a surveillance incident data communication management module 306. Event data evaluating module 304 and surveillance incident data communication management module 306 may each be implemented as a separate software application; as one or more objects, methods, or other portions of software code within a single software application; or as libraries of separate software applications, processes, and/or other portions of software code, for example.

The software modules implementing ASIRS 302 may be embodied in a computer program product that may be loaded onto data storage/memory devices 322 for execution by one or more processors 324. Event data evaluating module 304 and surveillance incident data communication management module 306 may contain executable instructions that configure processors 324 into machines that perform any of the applicable functions described herein. ASIRS 302 may be implemented at least in part in special-purpose hardware elements other than processors 324 and data storage/memory devices 322 in various examples.

Event data evaluating module 304 may receive data on aircraft events, determine whether the surveillance data indicate that an event qualifies as a surveillance incident, and determine what surveillance data is relevant to the surveillance incident. For example, event data evaluating module 304 may determine whether the surveillance incident qualifies for reporting relative to a set of surveillance incident reporting criteria. The set of surveillance incident reporting criteria may include criteria based on at least one of: a time to intercept between the aircraft and an external hazard, a distance between the aircraft and the external hazard, a velocity change needed for the aircraft to avoid the external hazard, and receipt of any of a selected set of alerts or triggers from one or more surveillance alerting systems and/or anomaly alerting systems, which may be based on the criteria applied by each individual alerting system. For example, TCAS system 312 may apply a complex algorithm based on several criteria including speed, heading, altitude, etc. of an ownship and an intruder aircraft in determining whether to generate a TA or an RA, and event data evaluating module 304 of ASIRS 302 may be configured to accept and interpret an RA generated by the TCAS system 312 as a qualifying criterion for generating and potentially transmitting a surveillance incident report and/or a summary digest. In some examples, ASIRS 302 may perform its own criteria processing of time to intercept between the ownship and the intruder aircraft based on speed, heading, and potentially any other flight dynamics parameters of both the ownship and the intruder aircraft, potentially independently of the outputs of a TCAS or other collision avoidance system, to determine whether to generate or transmit a surveillance incident report or a notification or other digest of surveillance incident data, and potentially to determine whether to generate and transmit the incident report or digest at the highest priority level or at some other priority level. In some examples, ASIRS 302 may also perform its own criteria processing of velocity change required to avoid interception between the ownship and the intruder aircraft, also based on flight dynamics of both vehicles, as an independent criterion to determine whether to generate or transmit a surveillance incident report or a notification or other digest of surveillance incident data, and potentially to determine whether to generate and transmit the incident report or digest at the highest priority level or at some other priority level.

Event data evaluating module 304 of ASIRS 302 may also be configured to accept and interpret certain Boolean outputs from any of a variety of other surveillance alerting systems or anomaly reporting systems as triggers for generating and potentially transmitting a surveillance incident report and/or a summary digest. Such surveillance alerting systems or anomaly reporting systems may illustratively include a stall warning system, an icing detector, an anomalous pilot control monitoring system, a crew impairment monitoring system, an anomalous cockpit/cabin condition monitoring system, or any other type of surveillance alerting systems or anomaly reporting systems that may detect any of certain surveillance incidents or other anomalous incidents or conditions, and may potentially perform complex algorithms based on any one or more set of input data in performing their functions, and may output a Boolean trigger as part of or corresponding to an alert, that may be received as a reporting trigger by event data evaluating module 304 of ASIRS 302. Any such output, from any such surveillance system or other type of anomaly reporting system including any of those described above or below, that may constitute an automatic reporting trigger for ASIRS 302, or that ASIRS 302 may be configured to interpret as an automatic reporting trigger, may be referred to as a "trigger from an anomaly alerting system" for purposes of this disclosure. Event data evaluating module 304 may communicate the data relevant to the anomalous incident to surveillance incident data communication management module 306 (or an analogous, more generalized anomalous incident data communication management module) for communication to the applicable surveillance data transmission system, e.g., VHF transceiver 334 or Gatelink transceiver 344, for transmission from aircraft 300, in response to determining that the surveillance incident qualifies for reporting relative to the set of surveillance incident reporting criteria.

Event data evaluating module 304 may determine whether the surveillance incident is of qualifying severity or otherwise qualifies for reporting relative to the set of surveillance incident reporting criteria by determining whether aircraft 300 came within a minimum separation threshold of the external hazard based on the set of surveillance incident reporting criteria, for example. Event data evaluating module 304 may determine whether aircraft 300 came within the minimum separation threshold of the external hazard based on the set of surveillance incident reporting criteria by making determinations such as determining that the time to intercept between the aircraft and the external hazard was less than a threshold time, as described further below; that the distance between the aircraft and the external hazard was less than a threshold distance, also as described further below, and wherein the threshold distance may be determined at least in part on the altitude of the aircraft; or that the velocity change needed for the aircraft to avoid the external hazard was greater than a threshold velocity change, for example also as described further below. Event data evaluating module 304 may also receive and interpret certain alerts or Boolean outputs from certain surveillance systems or anomaly detection systems as qualifying criteria for performing surveillance incident reporting or more generally anomalous incident reporting, as described above.

Event data evaluating module 304 may also determine a priority level of the surveillance incident based on the same or similar criteria, such as by ranking a surveillance incident as higher priority if the minimum distance or time to intercept between the aircraft and the external hazard was less than a lower distance or time threshold than for qualifying as a surveillance incident, or if the minimum velocity change needed for the aircraft to avoid the external hazard was greater than a velocity change threshold for qualifying as a surveillance incident. In some examples, event data evaluating module 304 may be configured to assign a certain set priority to a certain type of alert or to a Boolean trigger output from one or more certain alerting systems. In some examples, event data evaluating module 304 may also be configured to generate a summary digest of the surveillance incident or other type of anomalous incident and to assign a priority level to the digest. Event data evaluating module 304 may select the surveillance data transmission mode based on the determined priority level of the surveillance incident, and thereby determine a selected data transmission mode to transmit the surveillance data based on the priority level prior to detecting that the aircraft is in the status that makes available the selected data transmission mode.

Surveillance incident data communication management module 306 may store designations of one or more selected or preferred data transmission modes for communicating to a data transmission system for transmitting off of aircraft 300 to operator network 140, based on one or more levels of qualifying severity of the surveillance incident. ASIRS 302 may also enable the threshold levels for various types of surveillance incidents, or other levels of qualifying severity of surveillance incidents, and the types of data transmission modes applicable to different threshold levels or severity levels of the surveillance incident, to be configurable by a user (e.g., by the airline or other aircraft operator). Surveillance incident data communication management module 306 may also detect what data transmission modes are currently available depending on whether they are in range of aircraft 300 or if aircraft 300 is otherwise in a status that makes a selected data transmission mode available. For example, surveillance incident data communication management module 306 may regularly interrogate VHF transceiver 334, Gatelink transceiver 344, and SatCom transceiver 354 to determine whether these transmission systems currently have a connection with or are in range of their applicable counterpart systems external to the aircraft.

Surveillance incident data communication management module 306 may also detect conditions such as the position, speed, altitude, and weight on wheels of aircraft 300. CMU (ACARS) 332 may itself track via VHF ground antennas and SatCom transceiver 354 whether VHF and SatCom are currently in range, such as by getting an indication of carrier frequency lock from the VHF radio in the case of VHF, and may manage defaulting to VHF communication when aircraft 300 is in range for VHF transmissions.

ASIRS 302 may thus be configured to detect when aircraft 300 is in range for transmissions via VHF transceiver 334 to VHF ground antenna 220 or via Gatelink transceiver 344 to Gatelink network 230 at airport gate 232. ASIRS 302 may thus communicate surveillance incident data to VHF transceiver 334 and/or Gatelink transceiver 344 for transmission to VHF ground antenna 220 or Gatelink network 230, respectively, and thereby to transmit the surveillance incident data to operator network 140.

In some implementations, ASIRS 302 may have designated preferences for sending an initial notification or other type of digest of a surveillance incident (hereafter, either "surveillance incident" or simply "incident") via a first transmission mode, and for sending the full set of relevant data related to the surveillance incident via a second transmission mode. For example, surveillance incident data communication management module 306 of ASIRS 302 may have stored a designated preference to send the initial notification or other digest of an incident (after ASIRS 302 first determines that an event with aircraft 300 qualifies as an incident) to operator network 140 via any transmission mode available, including SatCom, as soon as or within a short time of ASIRS 302 first determining that an event qualifies as an incident, and subsequently to transmit the complete relevant set of surveillance data related to the incident (hereafter, either "surveillance data" or simply "data") once the preferred second transmission mode (e.g., VHF, HF, Gatelink) is in range, or when the aircraft is otherwise in a status that makes available the selected second data transmission mode. The stored preferences for the first transmission mode for transmitting the initial incident notification or digest may indicate to use Gatelink, VHF, HF, or SatCom, whichever is available at the time and in that or any other order of preference, in some examples. The notification or summary digest (collectively included within the term "digest" for purposes of this disclosure) may include an indication of the nature and type of the surveillance incident or other anomalous incident and may include some initial or summary data selected from among the larger set of surveillance data relevant to the anomalous incident.

The initial notification or summary digest may include some basic data that ASIRS 302 may select that apprises an operator of the basic pertinent information about the incident, such as a copy or an indication of an advisory or alert (e.g., TCAS RA, a GPWS alert, or a weather system alert), along with a basic indication of the time and the aircraft's position, speed, heading, and/or altitude at the time of the advisory or alert, and the identity or nature of the other aircraft, ground obstacle, or weather system involved in the advisory or alert, for example. ASIRS 302 may thus detect that aircraft 300 is in a status that makes available a first selected data transmission mode for transmitting notifications, prior to detecting that the aircraft is in the status that makes available the second selected data transmission mode for transmitting the full relevant set of incident data. ASIRS 302 may generate a notification of the incident, and communicate the notification of the incident from the aircraft via the first selected data transmission mode, such as SatCom, while saving the full set of data relevant to the incident for later transmission via the second selected data transmission mode, such as VHF or Gatelink. Aircraft 300 may subsequently receive a downlink request for the complete set of surveillance data, potentially with a designated data transmission mode or a designated priority setting that implies a designated data transmission mode for transmitting the complete set of surveillance data. ASIRS 302 may then communicate the complete set of surveillance data relevant to the surveillance incident to the transmission system for transmission from the aircraft via the selected data transmission mode in response to receiving the downlink request for the surveillance data in response to the notification, in this example.

The downlink request received by ASIRS 302 may include an indication of a designated priority level for transmitting the surveillance data, e.g., an additional larger body of surveillance data or the main body of surveillance data, indicated by the notification or digest, in response to the digest. ASIRS 302 may then communicate the surveillance data relevant to the surveillance incident to the transmission system for transmission from the aircraft in response to the digest, in accordance with the priority level comprised in the received downlink request. This may include, if the priority level comprised in the received downlink request is high priority, ASIRS 302 selecting a transmission mode from among one or more of SatCom, HF, VHF, ground-based broadband, and ground-based cellular, based on which transmission mode is currently available and enables transmission of the surveillance data within a shortest interval of time. If the priority level comprised in the received downlink request is low priority, ASIRS 302 may select the transmission mode as a lowest-cost mode selected from among at least Gatelink and SatCom. The lowest-code mode is currently typically Gatelink, though it is anticipated that low-cost SatCom will become increasingly available as a lowest-cost mode. If the lowest-cost mode is Gatelink, ASIRS 302 may only transmit further surveillance data once the aircraft 300 is in range for Gatelink, e.g., at an airport gate or at least proximate to an airport. If the priority level comprised in the received downlink request is intermediate priority, ASIRS 302 may select the transmission mode from among one or more of SatCom, HF, VHF, ground-based broadband, and ground-based cellular based on criteria that include reduced expense of transmission mode and transmission within a selected interval, e.g., whichever transmission mode that is least expensive among all transmission modes either currently available or anticipated to become available within a selected interval, such as an interval of time of one hour, two hours, or other interval of time, or a selected interval of distance travelled, such as within 500 nautical miles or 1,000 nautical miles, among other possible examples, or any other selected interval.

Figure 4:
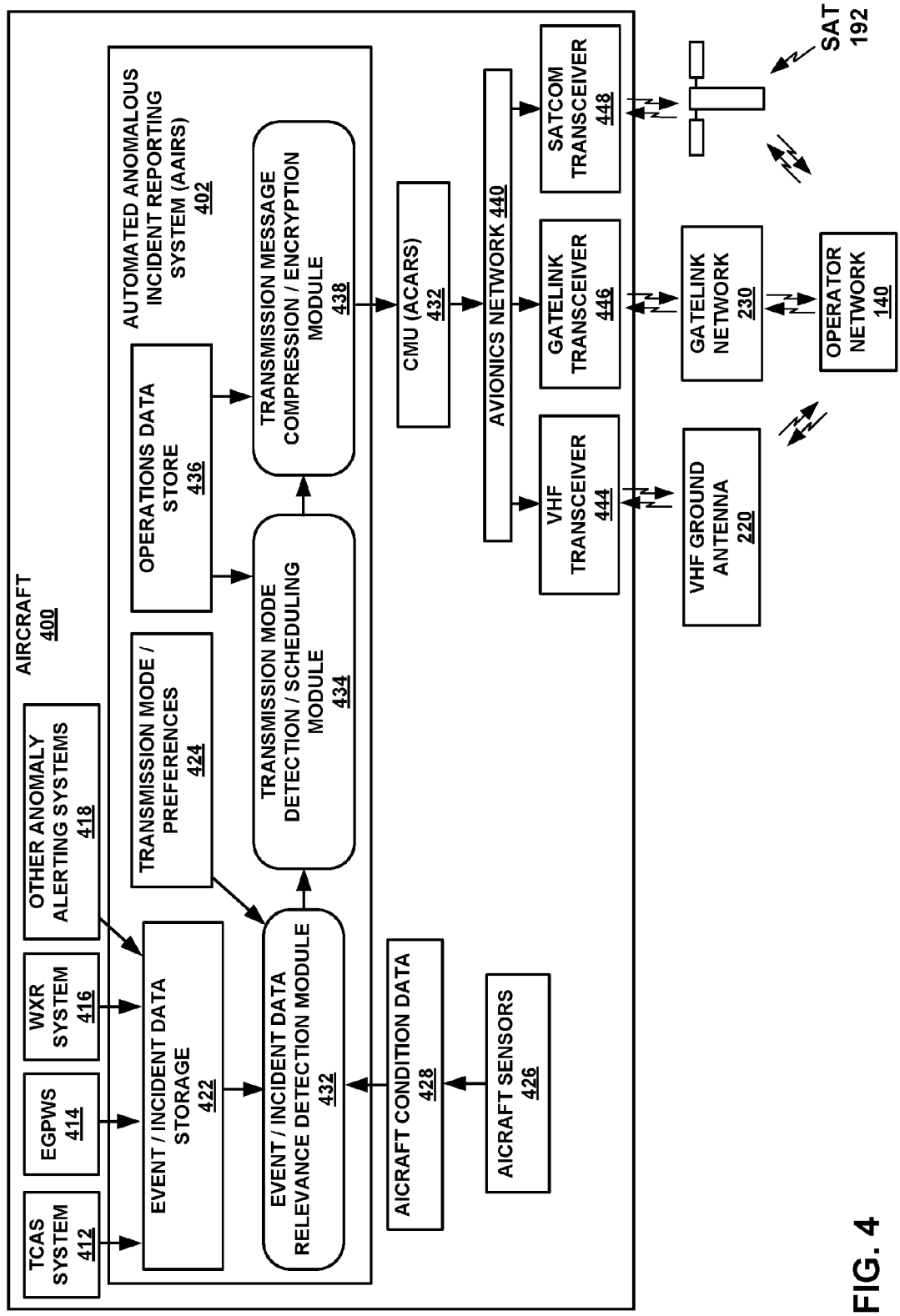
FIG. 4 shows a conceptual block diagram of an aircraft equipped with an automated anomalous incident reporting system, in another illustrative implementation.

FIG. 4 shows a conceptual block diagram of an aircraft 400 equipped with an automated anomalous incident reporting system (AAIRS) 402, in another illustrative implementation. AAIRS 402 is a more generalized implementation of an ASIRS as described above, in that AAIRS is configured to receive both surveillance alerts from surveillance systems and other types of non-surveillance-related anomaly alerts from other types of anomaly reporting systems. AAIRS 402 includes an event/incident data storage 422 connected to a TCAS system 412, an EGPWS 414, and a WXR system 416 ("event detection systems 412-416"), and potentially any of various other anomaly alerting systems 418 (such as the examples discussed above including a flight dynamics alert system, a TAWS, a cabin pressure alert system, a pilot condition alert system, an internal status alert system, or any of the other types of anomaly alerting systems described above), and configured to receive event and incident data from event detection/anomaly alerting systems 412-418, where incident data may refer to resolution advisories and alerts, and event data may refer more generally to any data collected by event detection systems 412-418. AAIRS 402 also includes an event/incident data relevance detection module 432, which may receive event and incident data from event/incident data storage 422 as well as aircraft condition data 428 from aircraft sensors 426. Aircraft condition data 428 may include data on the position, speed, heading, and altitude of aircraft 400 in addition to data on internal and external temperature and pressure, and data on the local airspeed, the condition of the engines, the state of the flight surfaces, and potentially any other data that aircraft sensors 426 of any type may collect, and data specifically calculated by the surveillance system functions. Event/incident data storage 422 and aircraft condition data 428 may be implemented as portions of one or more data storage devices, or as their own dedicated data storage devices.

Event/incident data relevance detection module 432 may evaluate the aircraft condition data 428 and the event/incident data from event/incident data storage 422, identify data that indicates any event that qualifies as an incident according to incident qualifying criteria stored in event/incident data relevance detection module 432, and identify the data onboard the aircraft that is relevant to an identified incident involving the aircraft. Event/incident data relevance detection module 432 may also be connected to transmission mode preferences 424 which may include a set of data and/or algorithms indicating selected preferred data transmission modes for transmitting relevant incident data, and potentially for transmitting incident notifications. Transmission mode preferences 424 may store an indication that incident data should be transmitted via VHF, HF, or via Gatelink, for example. Transmission mode preferences 424 may store an indication that urgent or high priority incident notifications should be sent without delay via SatCom if possible, or via HF, or ground-based broadband, or ground-based cellular, or VHF if SatCom is not available, for example.

Event/incident data relevance detection module 432 may communicate indications of incidents, notification data for event notifications or summary digests, and full sets of relevant incident data to transmission mode detection/scheduling module 434. Transmission mode detection/scheduling module 434 may interrogate transmission components, track aircraft position against a data store of transmission mode coverage (e.g., VHF coverage), and keep track of what transmission modes are available. Transmission mode detection/scheduling module 434 may predict when aircraft 400 should be in range of a selected transmission mode, and schedule incident data transmissions for the predicted time when aircraft 400 should be in range of a selected transmission mode.

Transmission mode detection/scheduling module 434 may thus detect that aircraft 400 is in range of a selected data transmission mode or otherwise in a status that makes available the selected data transmission mode. Other than being in range for the selected data transmission mode, transmission mode detection/scheduling module 434 may detect that aircraft 400 is in a status that makes available the selected data transmission mode such as by detecting that the applicable transmission system is in working order and is not currently occupied with other transmissions, for example. Transmission mode detection/scheduling module 434 may schedule transmissions of data relevant to the incident, or transmissions of an incident notification, in between or intermittently between other transmissions or other activity of the applicable data transmission systems, for example.

Transmission mode detection/scheduling module 434 may communicate data onward to transmission message compression/encryption/packaging/formatting module 438 ("transmission message compression/encryption module 438") when the selected transmission mode is available to transmit either a full data set relevant to an incident, or a notification of an incident. Event/incident data relevance detection module 432, transmission mode detection/scheduling module 434, and transmission message compression/encryption module 438 may be implemented as separate software applications, portions of a single application, libraries, embedded firmware, one or more GPUs, one or more FPGAs, one or more ASICs, or any other software and/or hardware implementation.

Transmission mode detection/scheduling module 434 and transmission message compression/encryption module 438 may both be connected to and receive information from operations data store 436, which may provide indications of specific conditions or constraints on selected data transmission modes or applicable scheduling or data compression or encryption conditions, for example. Transmission message compression/encryption module 438 may compress and/or encrypt a full relevant incident data set or an incident notification for transmission, and communicate the potentially compressed and/or encrypted transmission via CMU (or ACARS) 432 and avionics network 440 to the applicable data transmission system, either VHF transceiver 444 (used either for transmitting ACARS or non-ACARS VHF signals), Gatelink transceiver 446, or SatCom transceiver 448 (which may be an Ka-band transceiver, a Ku-band transceiver, or any other applicable SatCom transmission component). Transmission message compression/encryption encryption module 438 may also perform packaging and/or formatting the data for the transmission message, such as by applying one or more data integrity checks (e.g., a cyclic redundancy check (CRC)). VHF transceiver 444, HF ACARS transceiver, Gatelink transceiver 446, or SatCom transceiver 448 may transmit the incident data (or incident notification) to VHF ground antenna 220, Gatelink network 230, or datalink satellite 192, respectively, and thereby to operator network 140.

A receiving system at operator network 140 may decrypt, decompress, and format the incident data or notification, and make it available to applicable personnel, such as by sending the notification or the data or a notification of a full set of data via an email message addressed to the applicable personnel, and/or by posting the formatted data to an internal document, report, web page, or data store, for example. In some examples, operator network 140 may operate a flight history tools data system, and may post the formatted incident data to the flight history tools data system, and send an email notification of the data to the applicable personnel once the full set of data relevant to the incident is available in the flight history tools.

Figure 5:
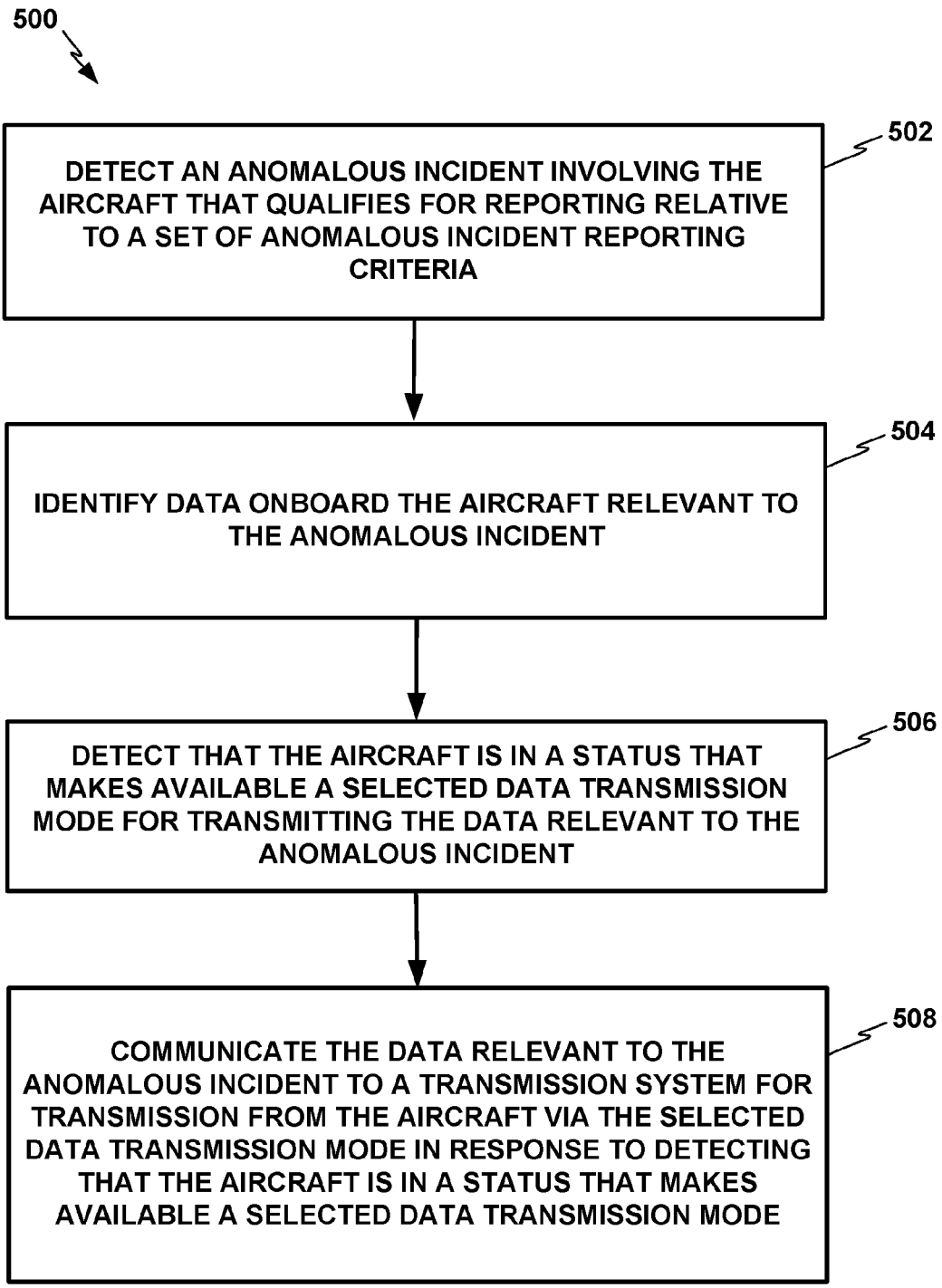
FIG. 5 depicts a flowchart for an example process that an automated anomalous incident reporting system may implement for detecting and transmitting anomalous incident data, in accordance with illustrative aspects of this disclosure.

FIG. 5 depicts a flowchart for an example process 500 that an ASIRS 102, 202, 212, 302, and/or AAIRS 402 (collectively, "ASIRS/AAIRS 102, 202, 212, 302, 402") may implement for detecting and transmitting surveillance incident data, in accordance with illustrative aspects of this disclosure. In this example, process 500 includes detecting, by a processing device onboard an aircraft (e.g., by ASIRS/AAIRS 102, 202, 212, 302, 402, or in particular by event data evaluating module 304 or event/incident data relevance detection module 432), an anomalous incident involving the aircraft that qualifies for reporting relative to a set of anomalous incident reporting criteria (e.g., ASIRS/AAIRS 102, 202, 212, 302, 402 detecting selected alerts from a surveillance alerting system or other anomaly alerting system, potentially as evaluated in comparison with one or more criteria for priority levels or urgency levels as described above) (502). Process 500 further includes identifying, by the processing device (e.g., by ASIRS/AAIRS 102, 202, 212, 302, 402, or in particular by event data evaluating module 304 or event/incident data relevance detection module 432), data onboard the aircraft relevant to the anomalous incident (e.g., surveillance incident data collected and/or communicated via TCAS system 112, 312, 412, GPWS 114, 314, 414, WXR system 116, 316, 416, anomalous incident data collected and/or communicated via other anomaly alerting systems 418 and/or any other alerting system as discussed above, and/or aircraft sensors 426, where the ASIRS/AAIRS "identifying" the surveillance data, anomalous incident data, or other data relevant to the anomalous incident may include or be accompanied by the ASIRS/AAIRS gathering, storing, indexing, editing, summarizing, packaging, compressing, and/or otherwise managing the data relevant to the anomalous incident) (504).

Process 500 further includes detecting, by the processing device (e.g., detecting by ASIRS/AAIRS 102, 202, 212, 302, 402, or in particular by surveillance incident data communication management module 306 or an analogous anomalous incident data communication management module of an AAIRS, or transmission mode detection/scheduling module 434), that the aircraft is in a status that makes available a selected data transmission mode to transmit the data relevant to the anomalous incident (e.g., that the aircraft is in range of a VHF ground antenna, or that the aircraft is at or close enough to an airport gate to be in range for Gatelink, where the data to be transmitted may be a body or report or "full set" of data relevant to the anomalous incident, including any of an edited, summarized, packaged, compressed, or otherwise modified body of surveillance data, or a notification or other digest of data relevant to the anomalous incident, as may be modified, packaged, and/or generated by ASIRS/AAIRS 102, 202, 212, 302, 402) (506). Process 500 further includes communicating, by the processing device, the data relevant to the anomalous incident to a transmission system (e.g., communicating the incident data by ASIRS/AAIRS 102, 202, 212, 302, 402, or in particular by surveillance incident data communication management module 306 or an analogous anomalous incident data communication management module of an AAIRS, or transmission mode detection/scheduling module 434, to VHF transceiver 444, Gatelink transceiver 446, SatCom transceiver 448, or other transceiver configured for communications via HF, ground-based broadband, ground-based cellular, or any other applicable communication technology) for transmission from the aircraft via the selected data transmission mode (e.g., for transmission from the aircraft by VHF transceiver 204, 334, 444, or for transmission by Gatelink transceiver 214, 344, 446, or for transmission by SatCom transceiver 354, 448) in response to detecting that the aircraft is in the status that makes available the selected data transmission mode (508). In some examples, ASIRS/AAIRS 102, 202, 212, 302, 402 may perform additional functions, such as monitoring for downlink requests for transmission of ongoing real-time data or other additional recorded data.

"Surveillance data" and "anomaly data" as described herein may include numerical values representative of conditions detected by aircraft sensors or computed by algorithms based on these sensor inputs. The data may be time-sequenced and time-correlated in one or more methods, directly or indirectly. Examples of "conditions" in this context may include aircraft position, speed, heading, altitude, pitch, and roll; changes or rates of change on all the above; crew inputs such as selected heading, destination airport, flight management mode, range and mode settings on navigation displays, radio control settings, audio volume settings, ambient noise levels, equipment failure (inoperative or "inop") indications, and/or other values. For instance, an exemplary implementation of AESS 310 described above may have almost 4,000 input or computed data values available, many of which are updated at rates of around 20 to 50 times per second. The specific data values, types, ranges, update rates, etc. may vary in different implementations.

Communicating the data relevant to the anomalous incident to a transmission system for transmission from the aircraft, as described herein, may include packaging and/or formatting the data, and then transferring the data package to a transmission system or device that is configured to transfer the data off-aircraft to one or more desired destinations. In this context, packaging and formatting the data may illustratively include: data compression; addition of headers specific to the surveillance incident, incident type, or operator; application of encoding protocols, such as ACARS or TCP/IP fragmentation, potentially including addition of secure routing information; application of various data integrity checks (e.g., cyclic redundancy check (CRC)); application of various security encodings (encryption); and/or addition of media-specific routing or scheduling information used by onboard equipment to schedule transmission via optimal methods or timings.

As described herein, an ASIRS or AAIRS may, for example, "automatically" transmit relevant anomalous incident data from aircraft systems to an off-aircraft system by making a determination, based on multiple factors, as to when and how to transmit the data. The multiple factors may include: size of the anomalous incident data package; urgency of the anomalous incident being reported; data transmission modes that are available at the current moment or that are anticipated to become available soon (e.g., within a selected interval of time, illustratively such as one hour or two hours), and the transmission costs associated with each; and cost and integrity requirements, preferences, or tradeoffs that the operator may establish. A desired off-vehicle location or destination, as described herein, may refer to an airline operations center, a contracted analysis facility, a destination mandated by a regulatory authority, a clearinghouse or storage center, or other entity that may either analyze the data or retain the data for later analysis.

Any of a wide variety of processing devices, such as processors 324, other components of ASIRS/AAIRS 102, 202, 212, 302, or 402, or other central processing units, ASICs, graphical processing units, computing devices, or processing devices of any other type may perform process 500 or portions or aspects thereof. An ASIRS/AAIRS 102, 202, 212, 302, 402, and/or other components of ASIRS/AAIRS 102, 202, 212, 302, 402 as disclosed above may be implemented in any of a variety of types of circuit elements. For example, processors or other components of ASIRS/AAIRS 102, 202, 212, 302, 402 may be implemented as one or more ASICs, as a magnetic nonvolatile random-access memory (RAM) or other types of memory, a mixed-signal integrated circuit, a central processing unit (CPU), a field programmable gate array (FPGA), a microcontroller, a programmable logic controller (PLC), a system on a chip (SoC), a subsection of any of the above, an interconnected or distributed combination of any of the above, or any other type of component or one or more components capable of being configured to detect relevant surveillance incident data, detect when a selected transmission mode is available for the aircraft, and communicate the surveillance incident data to an onboard transmission system on the aircraft in response to the selected transmission mode being available for the aircraft, and perform other functions in accordance with any of the examples disclosed herein.

Functions executed by electronics associated with the devices systems described herein may be implemented, at least in part, by hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in electronics included in components of ASIRS/AAIRS 102, 202, 212, 302, 402, or other systems described herein. The terms "processor," "processing device," or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to the devices and systems described herein may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure. The computer-readable medium may be non-transitory.

Any of the described units, modules or components may be implemented together or separately as discrete but interoperable logic devices. Depiction of different features as separate processors, modules, or units is intended to highlight different functions and does not necessarily imply that such processors, modules, or units must be realized by separate hardware or software components. Rather, functionality associated with one or more modules or units may be performed by separate hardware or software components, or integrated within common or separate hardware or software components.

Various aspects of the disclosure have been described. These and other aspects are within the scope of the following claims.

What is claimed is:

1. A system comprising:
   one or more processors; and
   one or more memory devices operably coupled to the one or more processors, wherein the one or more processors are configured to:
   detect an anomalous incident involving a vehicle on which the system is disposed and that qualifies for reporting relative to a set of anomalous incident reporting criteria;
   identify data collected or communicated by one or more systems onboard the vehicle, wherein such data is relevant to the anomalous incident;
   determine a priority level of the anomalous incident;
   generate a digest of the data relevant to the anomalous incident;
   detect that the vehicle is in a status that makes available a selected data transmission mode for transmitting the digest;
   communicate the digest to a transmission system for transmission from the vehicle via the selected data transmission mode in response to detecting that the vehicle is in the status that makes available the selected data transmission mode for transmitting the digest; and
   wherein if the priority level is low, detecting that the vehicle is in the status that makes available the selected data transmission mode network comprises detecting that the vehicle is at or proximate to a vehicle terminus.

2. The system of claim 1, wherein the one or more processors are further configured to:
   select the data transmission mode for transmitting the digest based on the determined priority level of the anomalous incident.

3. The system of claim 2, wherein the one or more processors are further configured to transmit the data relevant to the anomalous incident via the transmission system to a ground-based vehicle operator network, via the selected transmission mode based on the determined priority level of the anomalous incident, wherein the one or more processors are configured to:
   select, in response to determining the priority level as high priority, a transmission mode from among one or more of Satellite Communication (SatCom), High Frequency (HF), Very High Frequency (VHF), ground-based broadband, and ground-based cellular, based on which transmission mode is currently available and enables transmission of the surveillance data within a shortest interval of time;
   select, in response to determining the priority level as low priority, a transmission mode from among one or more of Gatelink and SatCom, based on which transmission mode is lowest cost; and
   select, in response to determining the priority level as intermediate priority, a transmission mode from among one or more of SatCom, High Frequency (HF), Very High Frequency (VHF), ground-based broadband, and ground-based cellular, based on criteria that comprise reduced expense of transmission mode and transmission within a selected interval.

4. The system of claim 2, wherein the one or more processors are further configured to:
   communicate, in response to determining that the priority level is high priority, both (1.) the data relevant to the anomalous incident, and (2.) an instruction to transmit the data relevant to the anomalous incident, directly to a communication system corresponding to the selected transmission mode, thereby bypassing a Communication Management Unit (CMU) of the vehicle, instead of communicating the data and the instruction to the CMU.

5. The system of claim 1, wherein the one or more processors are further configured to generate the digest such that the digest comprises an indication of a nature or type of the anomalous incident.

6. The system of claim 1, wherein the one or more processors are further configured to generate the digest such that the digest comprises summary data selected from among a larger set of surveillance data relevant to the anomalous incident.

7. The system of claim 6, wherein the selected data transmission mode is a first selected data transmission mode, wherein the one or more processors are further configured to:
   receive, via a second selected data transmission mode, a request for transmission of the larger set of surveillance data relevant to the anomalous incident and from which the summary data for the digest was selected; and
   communicate, in response to receiving the request, the larger set of surveillance data relevant to the anomalous incident to a transmission system for transmission from the vehicle via the second selected data transmission mode.

8. The system of claim 7, wherein the received request for transmission of the larger set of surveillance data relevant to the anomalous incident comprises a request for transmission of ongoing real-time data, and
   wherein the one or more processors are further configured to communicate, in response to the request for transmission of ongoing real-time data, additional data relevant to the anomalous incident to the transmission system for transmission from the vehicle in real-time.

9. The system of claim 7, wherein the received request for transmission of the larger set of surveillance data relevant to the anomalous incident comprises an indicated priority level for transmitting the larger set of surveillance data relevant to the anomalous incident, and
   wherein the one or more processors are further configured to communicate the larger set of surveillance data relevant to the anomalous incident to the transmission system for transmission from the vehicle, in response to the received request for transmission of the larger set of surveillance data, in accordance with the indicated priority level for transmitting the larger set of surveillance data relevant to the anomalous incident, such that the one or more processors are configured to:
   select, in response to the indicated priority level for transmitting the larger set of surveillance data relevant to the anomalous incident being high priority, from among one or more of SatCom, High Frequency (HF), Very High Frequency (VHF), ground-based broadband, and ground-based cellular, based on which transmission mode is currently available and enables transmission of the surveillance data within a shortest interval of time;
   select, in response to the indicated priority level for transmitting the larger set of surveillance data relevant to the anomalous incident being low priority, a lowest-cost mode from among at least Gatelink and SatCom; and
   select, in response to the indicated priority level for transmitting the larger set of surveillance data relevant to the anomalous incident being intermediate priority, from among one or more of SatCom, High Frequency (HF), Very High Frequency (VHF), ground-based broadband, and ground-based cellular, based on criteria that include reduced expense of transmission mode and transmission within a selected interval.

10. The system of claim 1, wherein the one or more processors being configured to detect that the vehicle is in the status that makes available the selected data transmission mode for transmitting the digest comprises the one or more processors being configured to:
    detect what transmission modes are currently available, from among transmission modes comprising one or more of SatCom, High Frequency (HF), Very High Frequency (VHF), ground-based broadband, and ground-based cellular; and
    determine which of the available transmission modes enables transmission of the digest within a shortest interval of time.

11. The system of claim 1, wherein the one or more processors being configured to identify the data onboard the vehicle that is relevant to the anomalous incident comprises the one or more processors being configured to identify data relevant to a Traffic Collision Avoidance System (TCAS) Resolution Advisory (RA), another type of surveillance alert, a ground proximity warning system (GPWS) alert, a weather system alert, a flight dynamics alert, a cabin pressure alert, a pilot condition alert, an internal status alert, or another type of trigger from an anomaly alerting system.

12. The system of claim 1, wherein the one or more processors are further configured to:
    store the data that is relevant to the anomalous incident.

13. The system of claim 12, wherein the one or more processors being configured to detect the anomalous incident comprises the one or more processors being configured to detect via at least one of a TCAS system, a ground proximity warning system (GPWS) system, a weather radar system, a flight dynamics alert system, a cabin pressure alert system, a pilot condition alert system, an internal status alert system, another type of cooperative surveillance system, another type of radar system, a lidar system, an ultrasound sensor system, an infrared sensor system, an optical image recognition system, or another type of sensor system.

14. The system of claim 1, wherein the set of anomalous incident reporting criteria comprise criteria based on at least one of: a time to intercept between the vehicle and an external hazard, a distance between the vehicle and the external hazard, a velocity change needed for the vehicle to avoid the external hazard, and a trigger from an anomaly alerting system,
   wherein the one or more processors being configured to determine whether the anomalous incident qualifies for reporting relative to the set of anomalous incident reporting criteria comprises the one or more processors being configured to determine at least one of: whether the vehicle came within a minimum separation threshold of the external hazard based on the set of anomalous incident reporting criteria, or whether the trigger from the anomaly alerting system qualifies for generating an anomalous incident report, and
   wherein the one or more processors being configured to determine whether the vehicle came within the minimum separation threshold of the external hazard based on the set of anomalous incident reporting criteria comprises determining: that the time to intercept between the vehicle and the external hazard was less than a threshold time; that the distance between the vehicle and the external hazard was less than a threshold distance, wherein the threshold distance is determined at least in part on the altitude of the vehicle; or that the velocity change needed for the vehicle to avoid the external hazard was greater than a threshold velocity change.

15. The system of claim 1, wherein the one or more processors being configured to identify the data onboard the vehicle that is relevant to the anomalous incident involving the vehicle comprises the one or more processors being configured to evaluate available data from one or more vehicle systems to select a portion of the available data determined to be relevant to the incident, and
   wherein the one or more processors being configured to communicate the data relevant to the anomalous incident to the transmission system for transmission from the vehicle comprises the one or more processors being configured to communicate to the transmission system the selected portion of the available data determined to be relevant to the anomalous incident.

16. The system of claim 1, wherein the vehicle comprises an aircraft.

17. A method comprising:
   detecting, with one or more processors of a system disposed on a vehicle, an anomalous incident involving the vehicle and that qualifies for reporting relative to a set of anomalous incident reporting criteria;
   identifying, with the one or more processors, data collected or communicated by one or more systems onboard the vehicle, wherein such data is relevant to the anomalous incident;
   determining, by with the one or more processors, a priority level of the anomalous incident;
   generating, with the one or more processors, a digest of the data relevant to the anomalous incident;
   detecting, with the one or more processors, that the vehicle is in a status that makes available a selected data transmission mode for transmitting the digest;
   communicating, with the one or more processors, the digest to a transmission system for transmission from the vehicle via the selected data transmission mode in response to detecting that the vehicle is in the status that makes available the selected data transmission mode for transmitting the digest; and
   wherein if the priority level is low, detecting that the vehicle is in the status that makes available the selected data transmission mode network comprises detecting that the vehicle is at or proximate to a vehicle terminus.

18. The method of claim 17, wherein the digest comprises an indication of a nature or type of the anomalous incident, and summary data selected from among a larger set of surveillance data relevant to the anomalous incident, the method further comprising:
   selecting the data transmission mode for transmitting the digest based on the determined priority level of the anomalous incident; and
   communicating the digest to the transmission system for transmission from the vehicle via the selected data transmission mode based on the determined priority level of the anomalous incident,
   wherein selecting the data transmission mode for transmitting the digest based on the determined priority level of the anomalous incident comprises:
   selecting, in response to determining the priority level as high priority, a transmission mode from among one or more of Satellite Communication (SatCom), High Frequency (HF), Very High Frequency (VHF), ground-based broadband, and ground-based cellular, based on which transmission mode is currently available and enables transmission of the surveillance data within a shortest interval of time;
   selecting, in response to determining the priority level as low priority, a transmission mode from among one or more of Gatelink and SatCom, based on which transmission mode is lowest cost; and
   selecting, in response to determining the priority level as intermediate priority, a transmission mode from among one or more of SatCom, High Frequency (HF), Very High Frequency (VHF), ground-based broadband, and ground-based cellular, based on criteria that comprise reduced expense of transmission mode and transmission within a selected interval.

19. A computer program product comprising a computer-readable medium having executable instructions stored thereon to cause a computing system to:
   detect an anomalous incident involving a vehicle on which the system is disposed and that qualifies for reporting relative to a set of anomalous incident reporting criteria;
   identify data collected or communicated by one or more systems onboard the vehicle, wherein such data is relevant to the anomalous incident;
   generate a digest of the data relevant to the anomalous incident;
   determine a priority level of the anomalous incident;
   detect that the vehicle is in a status that makes available a selected data transmission mode for transmitting the digest;
   communicate the digest to a transmission system for transmission from the vehicle via the selected data transmission mode in response to detecting that the vehicle is in the status that makes available the selected data transmission mode for transmitting the digest; and wherein if the priority level is low, detect that the vehicle is in the status that makes available the selected data transmission mode network comprises detect that the vehicle is at or proximate to a vehicle terminus.

20. The computer program product of claim 19, wherein the digest comprises an indication of a nature or type of the anomalous incident, and summary data selected from among a larger set of surveillance data relevant to the anomalous incident, and the executable instructions are to further cause the computing system to:

select the data transmission mode for transmitting the digest based on the determined priority level of the anomalous incident; and communicate the digest to the transmission system for transmission from the vehicle via the selected data transmission mode based on the determined priority level of the anomalous incident, wherein selecting the data transmission mode for transmitting the digest based on the determined priority level of the anomalous incident comprises:

selecting, in response to determining the priority level as high priority, a transmission mode from among one or more of Satellite Communication (SatCom), High Frequency (HF), Very High Frequency (VHF), ground-based broadband, and ground-based cellular, based on which transmission mode is currently available and enables transmission of the surveillance data within a shortest interval of time;

selecting, in response to determining the priority level as low priority, a transmission mode from among one or more of Gatelink and SatCom, based on which transmission mode is lowest cost; and selecting, in response to determining the priority level as intermediate priority, a transmission mode from among one or more of SatCom, High Frequency (HF), Very High Frequency (VHF), ground-based broadband, and ground-based cellular, based on criteria that comprise reduced expense of transmission mode and transmission within a selected interval.

* * * * *